United States Patent
Moon

(10) Patent No.: US 7,832,893 B2
(45) Date of Patent: Nov. 16, 2010

(54) DIRECT TYPE BACKLIGHT ASSEMBLY AND LIQUID CRYSTAL DISPLAY DEVICE HAVING THE SAME

(75) Inventor: Jeong Min Moon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 35 days.

(21) Appl. No.: 11/138,692

(22) Filed: May 27, 2005

(65) Prior Publication Data

US 2005/0265045 A1 Dec. 1, 2005

(30) Foreign Application Priority Data

May 31, 2004 (KR) .................. 1020040038853

(51) Int. Cl.
*F21V 7/04* (2006.01)
(52) U.S. Cl. .................. 362/225; 362/97.2; 362/97.3; 362/240; 362/241
(58) Field of Classification Search .................. 362/611, 362/612, 613, 614, 615, 561, 606, 610, 255, 362/236, 240, 560, 228, 235, 294, 245, 97.1–97.4, 362/241–248, 27, 330, 326–329, 600–634, 362/223–225, 260, 217.08–217.09; 349/62, 349/68, 61–65; 385/146
See application file for complete search history.

(56) References Cited

U.S. PATENT DOCUMENTS

| | | | |
|---|---|---|---|
| 5,786,665 A * | 7/1998 | Ohtsuki et al. | 313/512 |
| 5,803,579 A * | 9/1998 | Turnbull et al. | 362/516 |
| 5,986,728 A * | 11/1999 | Bernard | 349/68 |
| 6,188,527 B1 * | 2/2001 | Bohn | 359/710 |
| 6,415,531 B1 * | 7/2002 | Ohtsuki et al. | 36/31 |
| 6,527,414 B2 * | 3/2003 | Moon | 362/249 |
| 2002/0141183 A1 * | 10/2002 | Moon | 362/225 |
| 2002/0167811 A1 * | 11/2002 | Blanchard | 362/318 |
| 2004/0042194 A1 * | 3/2004 | Hsieh | 362/31 |
| 2004/0208003 A1 * | 10/2004 | Kuo | 362/241 |
| 2004/0233665 A1 * | 11/2004 | West et al. | 362/245 |
| 2005/0243577 A1 * | 11/2005 | Moon | 362/612 |
| 2006/0120107 A1 * | 6/2006 | Pao et al. | 362/612 |

FOREIGN PATENT DOCUMENTS

JP 2003228065 A * 8/2003

OTHER PUBLICATIONS

English Abstract of Japanese Publication JP 2003228065 A.*

* cited by examiner

*Primary Examiner*—Thomas M Sember
(74) *Attorney, Agent, or Firm*—Mckenna Long & Aldridge LLP

(57) ABSTRACT

A backlight assembly for a liquid crystal display device includes a plurality of lamps spaced apart from one another, a bottom cover accommodating the plurality of lamps, a reflection sheet below the plurality of lamps, and an auxiliary optical unit covering the plurality of lamps to adjust a traveling path of light emitted from the plurality of lamps.

14 Claims, 7 Drawing Sheets

DIRECT TYPE BACKLIGHT ASSEMBLY AND LIQUID CRYSTAL DISPLAY DEVICE HAVING THE SAME

The present invention claims the benefit of Korean Patent Application No. 2004/38853 filed in Korea on May 31, 2004, which is hereby incorporated by reference.

BACKGROUND OF THE INVENTION

1. Field of the Invention

The present invention relates a liquid crystal display device, and more particularly, a direct type backlight assembly and a liquid crystal display device having the same.

2. Discussion of the Related Art

Cathode ray tubes (CRTs) have been widely used for monitors of TVs, measuring instruments, terminals and the like. However, the CRTs could not cope well with tendency of miniaturization and lightweight because of their weight and size. Small-sized and light liquid crystal display devices (LCDs) have been actively developed in order to replace those CRTs. The LCDs have a lot of advantages, including low power consumption.

The LCDs have large contrast ratio and are adapted for displaying gray scales or moving pictures, and also have low power consumption. The LCDs can overcome the drawbacks of the CRTs, so that they are considered as a replacement of the CRTs. However, the LCDs are a non-luminous display device, so that they require an additional external light source to irradiate light. This is because the LCDs are a light receiving device to display an image by controlling an amount of incident light, son that an additional light source (that is, a backlight assembly) for irradiating light onto an LCD panel is required.

The external light source applied to the backlight assembly can-be properly selected depending on size and use of the LCD. The external light source may be a point light source such as a light bulb and a white halogen lamp, a line light source (e.g., a hot cathode or cold cathode fluorescent lamp), or a surface light source (e.g., a light emitting diode (LED)) formed in an electroluminescent (EL) matrix from.

Also, the backlight assembly is classified into an edge type and a direct type depending upon positions of the light source with respect to a display surface. The direct type backlight assembly has high light efficiency and is easy to handle, and it has no limit in size of the display surface. For such reasons, the direct type backlight assembly has been widely used in large liquid crystal panels of 30 inches or more.

The direct type backlight assembly does not require a light guide plate that converts the line light source into the surface light source. The direct type backlight assembly includes a plurality of lamps disposed below the display surface, a reflector sheet for reflecting light emitted from the lamps, so as to prevent light loss, and a diffuser plate disposed on the lamps to scatter the light to emit uniform light.

Since a considerable space exists between the lamps and the diffuser plate, the diffuser plate is drooped due to its weight and high temperature. In order to prevent this phenomenon, a plurality of supporters are disposed between the diffuser plate and the reflector sheet. Hereinafter, a structure of a related-art direct type backlight assembly will be described with the accompanying drawings.

FIG. 1 is an expanded perspective view of a direct type backlight assembly and FIG. 2 is a cross-sectional view taken along line A-A' of FIG. 1. Referring to FIGS. 1 and 2, the direct type backlight assembly 100 includes a plurality of lamps 101 and a bottom cover 102 where the lamps 101 are accommodated and spaced apart from one another by a predetermined distance. Also, the direct type backlight assembly 100 includes a reflector sheet 103 disposed below the lamps 101 to reflect upward the light emitted from the lamps 101, and an internal optical plate 104 disposed above the lamps 101 to reduce non-uniformity of the emitted light. The direct type backlight assembly 100 further includes a diffuser plate 105 disposed on the internal optical plate 104 to diffuse the light, and a diffuser sheet 106 disposed on the diffuser plate 105 to increase the diffusion of the light. The direct type backlight assembly 100 includes no separate light guide plate and the plurality of lamps 101 are arranged to be spaced apart by a predetermined distance.

FIG. 3 is a cross-sectional view illustrating a traveling direction of the light emitted from the lamps 101 of FIG. 1. As shown in FIG. 3, the light emitted from the lamps 101 transmits the internal optical plate 104 disposed on the lamps 101, and the distribution of light transmitting the optical plate 104 becomes uniform.

The diffuser plate 105 and the diffuser sheet 106 diffuse the light that is uniformly distributed. The internal optical plate 104 can solve the problem of the non-uniform light distribution. However, the internal optical plate 104 covers the front surface of the backlight where the lamps 101 are arranged, so that it may be distorted heat emitted from the lamps 101. Further, the use of the internal optical plate makes the backlight assembly thick.

SUMMARY OF THE INVENTION

Accordingly, the present invention is directed to a direct type backlight assembly and a liquid crystal display device having the same that substantially obviate one or more problems due to limitations and disadvantages of the related art.

An object of the present invention is to provide a direct type backlight assembly and a liquid crystal display device having the same, in which uniformity of light can be achieved by providing an auxiliary optical unit at a lamp.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight assembly for a liquid crystal display device includes a plurality of lamps spaced apart from one another, a bottom cover accommodating the plurality of lamps, a reflection sheet below the plurality of lamps, and an auxiliary optical unit covering the plurality of lamps to adjust a traveling path of light emitted from the plurality of lamps.

In another aspect of the present invention, a liquid crystal display device includes a backlight assembly including a plurality of lamps spaced apart from one another, a bottom cover accommodating the lamps, a reflection sheet below the lamps, and an auxiliary optical unit to cover the lamps to change a traveling path of light emitted from the lamps; and a liquid crystal display panel on the backlight assembly to display an image.

It is to be understood that both the foregoing general description and the following detailed description of the present invention are exemplary and explanatory and are intended to provide further explanation of the invention as claimed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
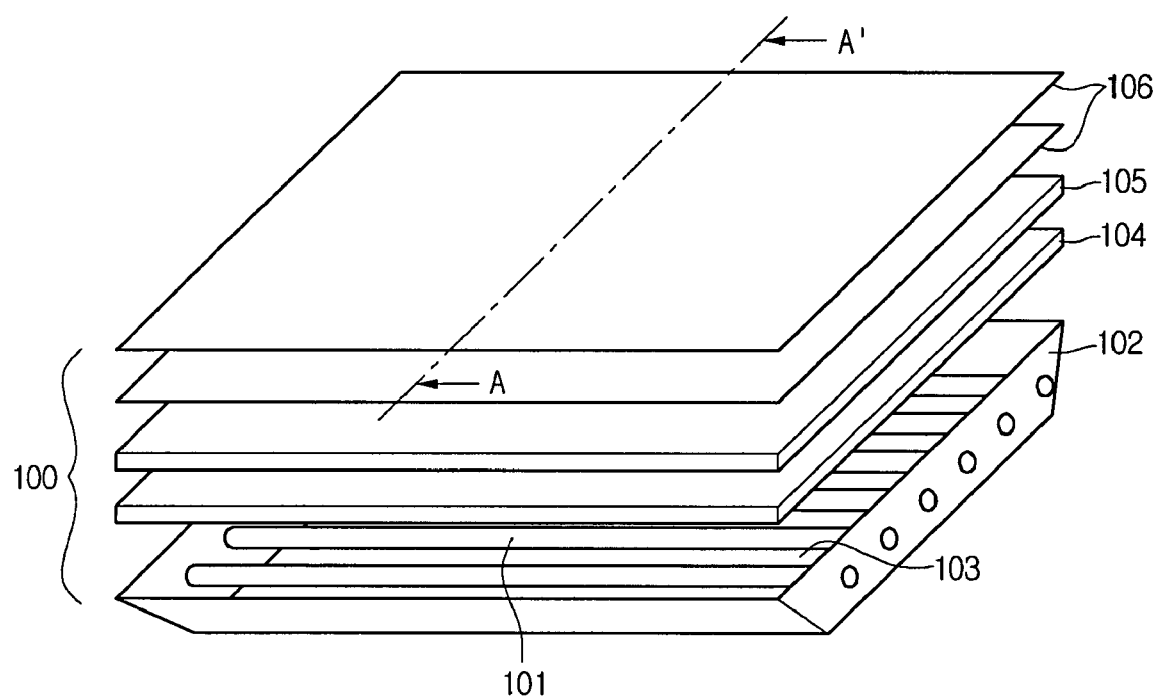
FIG. 1 is an expanded perspective view illustrating the related-art direct type backlight assembly of an LCD.
Figure 2:
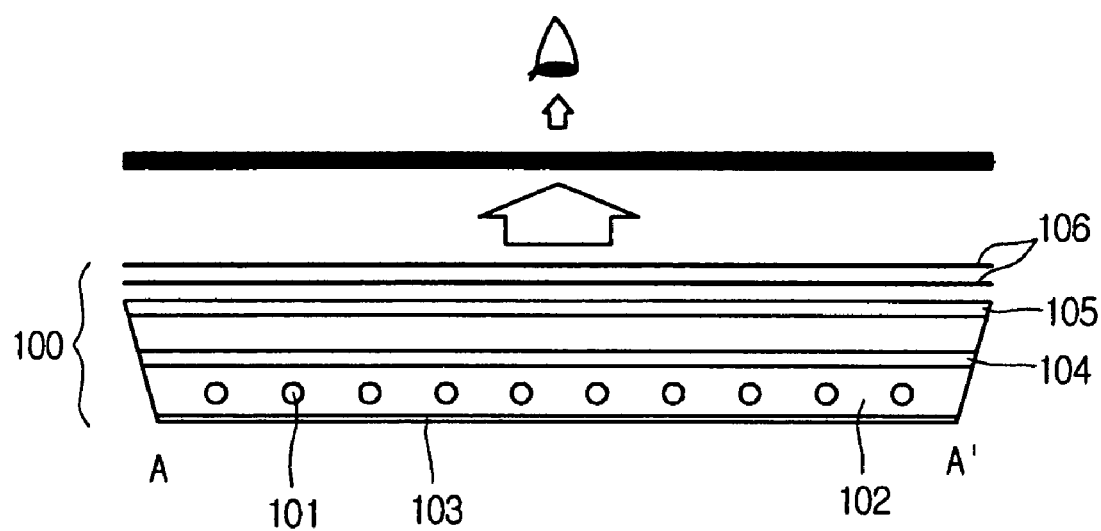
FIG. 2 is a cross-sectional view taken along line A-A'.
Figure 3:
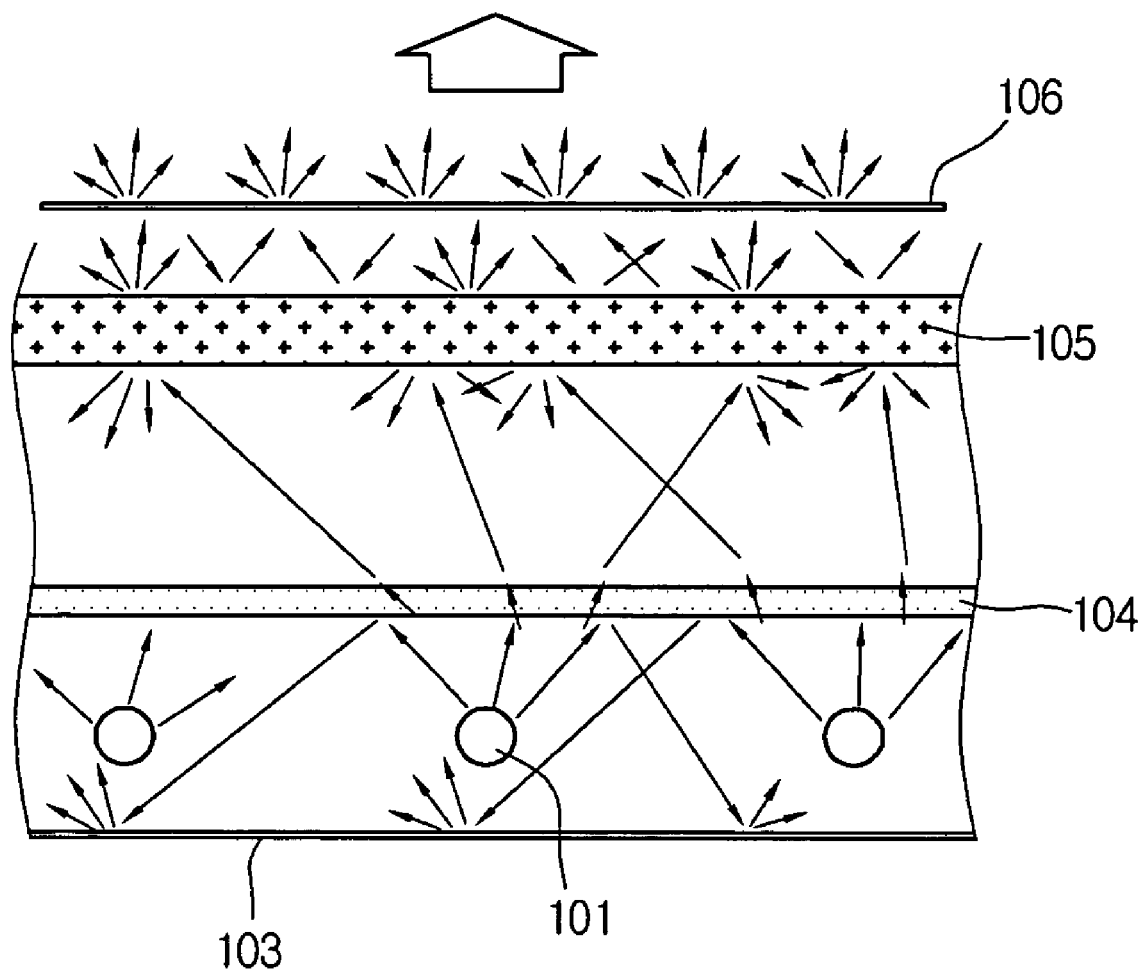
FIG. 3. is a cross-sectional view illustrating traveling directions of the light emitted from lamps of FIG. 1.
Figure 4:
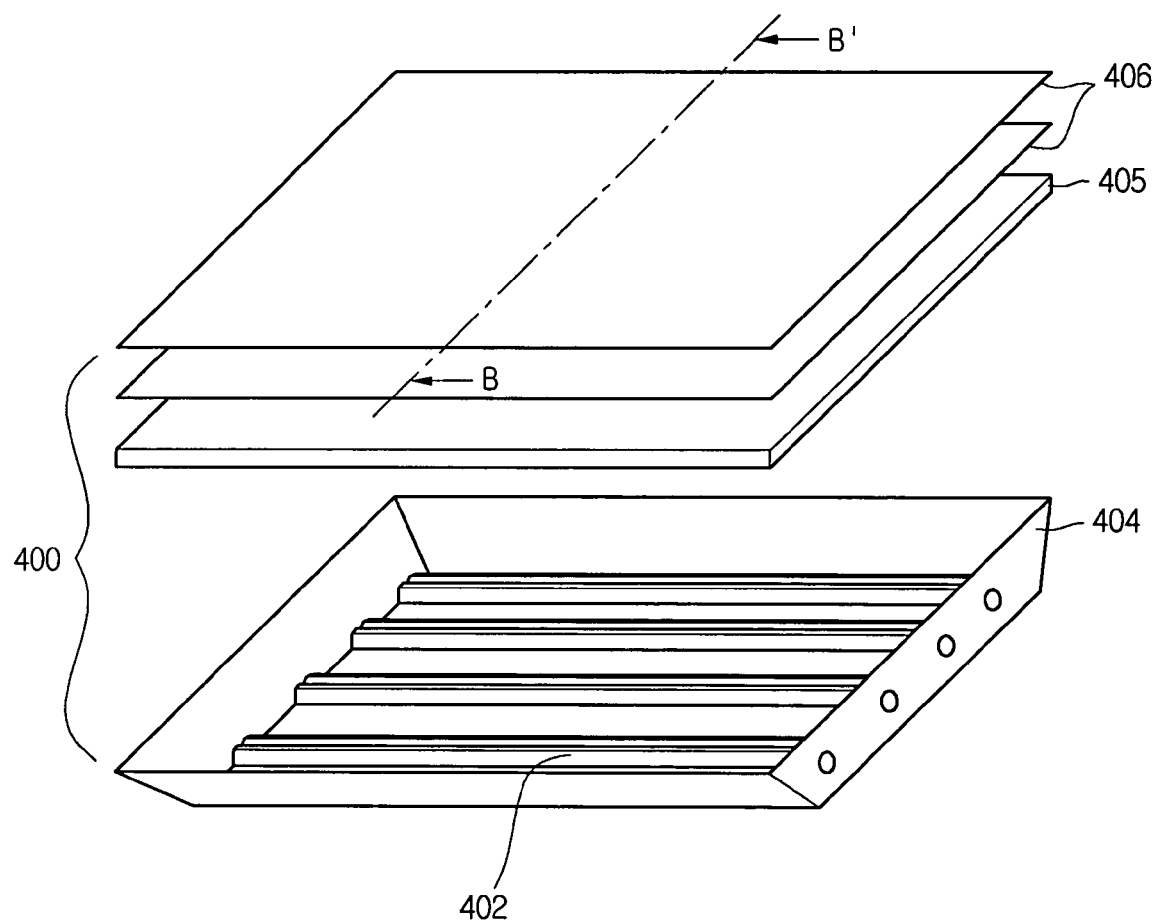
FIG. 4 is an expanded perspective view of a direct type backlight assembly according to an embodiment of the present invention.
Figure 5:
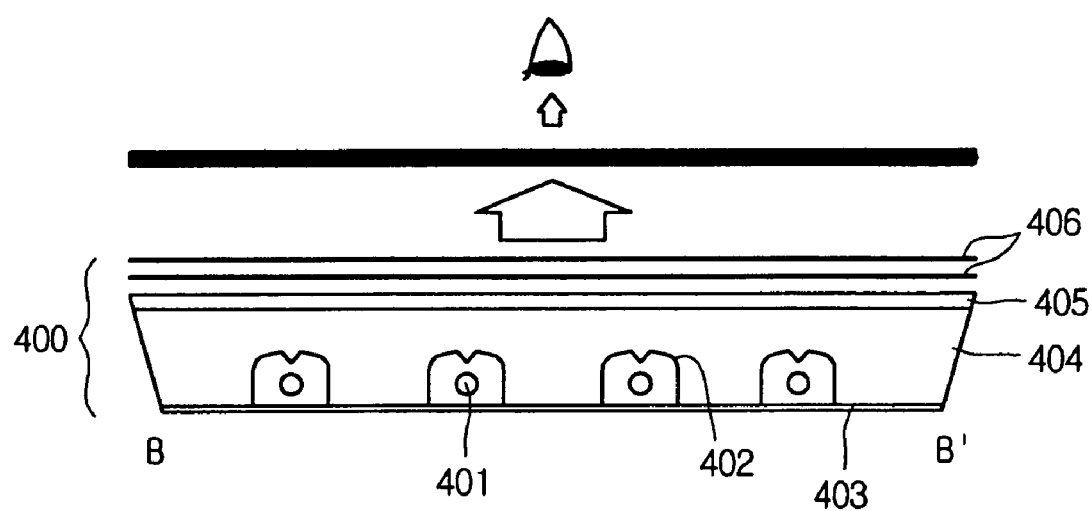
FIG. 5 is a cross-sectional view taken along line B-B' of FIG. 4.

FIG. 4 is an expanded perspective view of a direct type backlight assembly according to an embodiment of the present invention, and FIG. 5 is a cross-sectional view taken along line B-B' of FIG. 4.

Referring to FIGS. 4 and 5, a direct type backlight assembly 400 includes a plurality of lamps 401 and an auxiliary optical unit 402. The lamps 401 are disposed in parallel and spaced apart from one another by a distance. The auxiliary optical unit 402 is provided to cover the lamps 401 and changes the traveling path of light emitted from the lamps 401, so as to reduce non-uniformity of light distribution.

Further, the direct type backlight assembly 400 includes a bottom cover 404 where the lamps 401 are accommodated and spaced apart from one another by a distance, and a reflector sheet 403 disposed below the lamps 401 to reflect upward the light emitted from the lamps 401. The reflection plate 403 enhances light efficiency by reflecting upward the light emitted downward from the lamps 401.

Also, the direct type backlight assembly 400 includes a diffuser plate 405 and a diffuser sheet 406, which receive the uniform light from the auxiliary optical unit 402 and diffuse the incident light.

A prism sheet (not shown) and a protector (not shown) may be further provided on the diffuser sheet 406. The prism sheet may enhance brightness by condensing the light in up/down/right/left directions, while the protector protects the prism sheet and secures a viewing angle.

Figure 6:
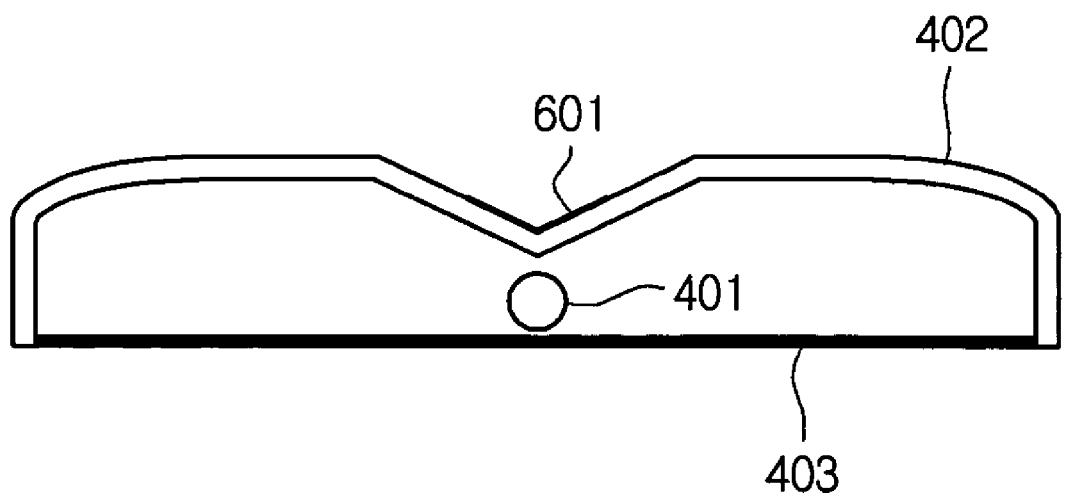
FIG. 6 is a schematic view of an auxiliary optical unit according to an embodiment of the present invention.
Figure 7:
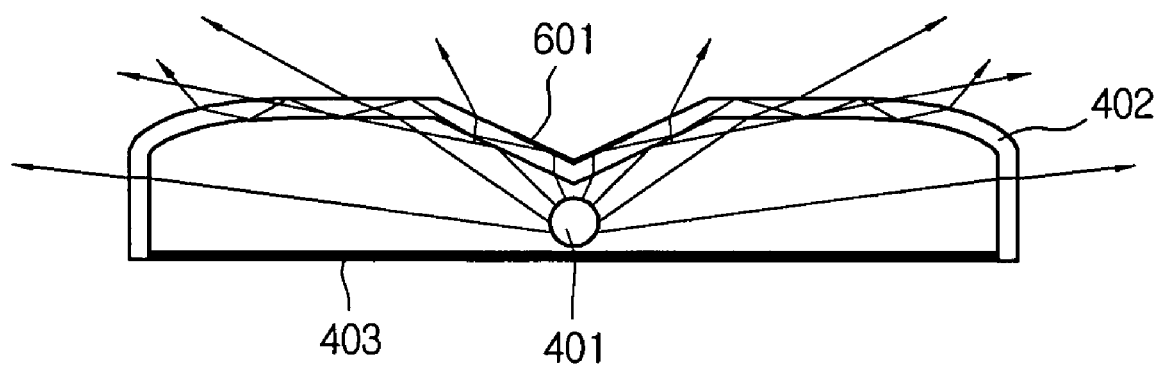
FIG. 7 is a schematic view of traveling paths in the auxiliary optical unit according to an embodiment of the present invention.

FIG. 6 is a schematic view of the auxiliary optical unit according to an embodiment of the present invention and FIG. 7 is a schematic view of light traveling paths in the auxiliary optical unit. As shown in FIGS. 6 and 7, the auxiliary optical unit 402 is disposed to cover the light from the surface of the lamps 401.

More specifically, the auxiliary optical unit 402 has a long shape in one axis to cover the plurality of lamps 401. Accordingly, the auxiliary optical unit 402 may be disposed as many as the number of the lamps according to the arrangement type of the lamps 401 and is formed in a lens shape that can diverge the light to the outside. Also, the auxiliary optical unit 402 may have a recession at a center portion corresponding to the lamp 401.

Meanwhile, although one auxiliary optical unit 402 is formed corresponding to one lamp 401, it may also be formed corresponding to two or more lamps. The light emitting part including the lamp 401 can be formed with two or more point light sources such as LED and a linear fluorescent lamp. The auxiliary optical unit 402 has continuity points and inflection points, so that the traveling direction of the light emitted from the lamp 401 can be changed in a desired direction. For example, the auxiliary optical unit 402 may have a top surface including a recessed inflection point corresponding to the lamp 401. Therefore, the light emitting path is changed, so that the light from the lamp 401 can travel uniformly in one direction.

Also, a diffusion pattern 601 may be further formed through one of a printing process, a fine topology formation, and corrosion, so as to obtain good light distribution characteristic (i.e., improvement of uniformity) at the inflection point.

In addition, in the backlight assembly according to an embodiment of the present invention, the diffuser plate 405 is disposed to be spaced apart from the lamp 401 by a distance, thereby minimizing brightness difference caused by the distance difference from the light emitting surface of the lamp 401.

Further, optical sheets such as a condensing sheet (or prism sheet), a diffuser sheet and a protector can be stacked on the auxiliary optical unit 402.

The direct type backlight assembly according to an embodiment of the present invention can be applied to the LCD device. The LCD device is provided with the direct type backlight assembly and an LCD panel on which an image is displayed. Since the construction and characteristics of the LCD panel are well known, a detailed description thereof is omitted throughout the specification of the present invention.

It will be apparent to those skilled in the art that various modifications and variations can be made in the direct type backlight assembly and the liquid crystal display device having the same of the present invention without departing from the spirit or scope of the invention. Thus, it is intended that the present invention cover the modifications and variations of this invention provided they come within the scope of the appended claims and their equivalents.

What is claimed is:

1. A backlight assembly for a liquid crystal display device, comprising:
 a plurality of lamps extending along a direction and spaced apart from one another;
 a bottom cover accommodating the plurality of lamps;
 a reflection sheet below the plurality of lamps;
 a plurality of auxiliary optical elements having a long, bar-like shape, each arranged in parallel to cover at least one of the plurality of lamps extending along the direction to adjust a traveling path of light emitted from the at least one lamps, wherein each auxiliary optical element has an upper surface having a recession region corresponding to the at least one lamp at a center area and a round region at the remaining area; and
 a diffusion pattern directly on and corresponding to a surface of the recession region of the auxiliary optical element,
 wherein each of the auxiliary optical elements is spaced apart from one another,
 wherein light from the lamp is diffused toward a front direction by the auxiliary optical element,
 wherein the upper surface of the auxiliary optical element has wholly the same height and the recession region is formed of the groove correspond to the lamp, and
 wherein the recession region is lower than the height of the upper surface.

2. The backlight assembly according to claim 1, wherein the auxiliary optical element has a lens shape.

3. The backlight assembly according to claim 1, further comprising a diffuser plate and a diffuser sheet on the auxiliary optical element.

4. The backlight assembly according to claim 1, wherein the plurality of lamps include one of a fluorescent lamp and a light emitting diode array.

5. The backlight assembly according to claim 1, wherein the adjusted light path is substantially uniform.

6. The backlight assembly according to claim 1, wherein the backlight assembly is a direct type.

7. The backlight assembly for a liquid crystal display device according to claim 1, wherein each of the plurality of auxiliary optical elements covers at least two of the plurality of lamps.

8. A liquid crystal display device comprising:
 a backlight assembly including a plurality of lamps extending along a direction and spaced apart from one another, a bottom cover accommodating the lamps, a reflection sheet below the lamps, and a plurality of auxiliary optical elements having a long, bar-like shape, each arranged in parallel to cover at least one of the lamps extending along the direction to change a traveling path of light emitted from the lamps, wherein each auxiliary optical element has an upper surface having a recession region corresponding to the at least one lamp at a center area and a round region at the remaining area; and
 a liquid crystal display panel on the backlight assembly to display an image,
 a diffusion pattern directly on and corresponding to a surface of the recession region of the auxiliary optical element,
 wherein each of the auxiliary optical elements is spaced apart from one another,
 wherein light from the lamp is diffused toward a front direction by the auxiliary optical element,
 wherein the upper surface of the auxiliary optical element has wholly the same height and the recession region is formed of the groove correspond to the lamp, and
 wherein the recession region is lower than the height of the upper surface.

9. The device according to claim 8, wherein the auxiliary optical element has a lens shape.

10. The device according to claim 8, further comprising a diffuser plate and a diffuser sheet on the auxiliary optical element.

11. The device according to claim 8, wherein the plurality of lamps includes one of a fluorescent lamp and a light emitting diode array.

12. The device according to claim 8, wherein the backlight assembly is a direct type.

13. The device according to claim 8, wherein the changed light path is substantially uniform.

14. The liquid crystal display device according to claim 8, wherein each of the plurality of auxiliary optical elements covers at least two of the plurality of lamps.

* * * * *